US008480799B2

(12) United States Patent
Itano et al.

(10) Patent No.: US 8,480,799 B2
(45) Date of Patent: *Jul. 9, 2013

(54) INKJET-RECORDING NON-AQUEOUS INK COMPOSITION, INKJET RECORDING METHOD, AND RECORDED MATTER

(75) Inventors: Masaaki Itano, Matsumoto (JP); Takashi Oyanagi, Matsumoto (JP); Chiyoshige Nakazawa, Suwa (JP); Hiroki Nakane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,423

(22) Filed: Sep. 30, 2010

(65) Prior Publication Data

US 2011/0014440 A1    Jan. 20, 2011

Related U.S. Application Data

(63) Continuation of application No. 12/284,225, filed on Sep. 18, 2008, now Pat. No. 7,828,888.

(30) Foreign Application Priority Data

Sep. 18, 2007 (JP) .................................. 2007-240669
Mar. 21, 2008 (JP) .................................. 2008-73058
Aug. 4, 2008 (JP) .................................. 2008-200353

(51) Int. Cl.
*C09D 11/02* (2006.01)

(52) U.S. Cl.
USPC .................. 106/31.75; 106/31.65; 106/31.86

(58) Field of Classification Search
USPC ................. 106/31.75, 31.65, 31.86
See application file for complete search history.

(56) References Cited

U.S. PATENT DOCUMENTS

| | | |
|---|---|---|
| 3,582,487 A | 6/1971 | Fuhr et al. |
| 3,607,693 A | 9/1971 | Heine et al. |
| 3,720,635 A | 3/1973 | Metzner et al. |
| 3,929,693 A | 12/1975 | Hochberg |
| 4,007,144 A | 2/1977 | Sanders et al. |
| 4,129,486 A | 12/1978 | Deutsch et al. |
| 4,133,793 A | 1/1979 | Lewis et al. |
| 4,190,602 A | 2/1980 | Brunisholz et al. |
| 4,233,195 A | 11/1980 | Mills |
| 4,239,866 A | 12/1980 | Reitel et al. |
| 4,239,966 A | 12/1980 | Wang |
| 4,308,400 A | 12/1981 | Felder et al. |
| 4,315,807 A | 2/1982 | Felder et al. |
| 4,318,791 A | 3/1982 | Felder et al. |
| 4,320,186 A | 3/1982 | Kato et al. |
| 4,321,118 A | 3/1982 | Felder et al. |
| 4,347,111 A | 8/1982 | Gehlhaus et al. |
| 4,370,379 A | 1/1983 | Kato et al. |
| 4,450,279 A | 5/1984 | Shirosaki et al. |
| 4,477,681 A | 10/1984 | Gehlhaus et al. |
| 4,507,466 A | 3/1985 | Tomalia et al. |
| 4,522,693 A | 6/1985 | Henne et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 4,721,734 A | 1/1988 | Gehlhaus et al. |
| 4,830,902 A | 5/1989 | Plantenga et al. |
| 4,922,004 A | 5/1990 | Kohler et al. |
| 5,041,516 A | 8/1991 | Frechet et al. |
| 5,077,402 A | 12/1991 | Desobry et al. |
| 5,212,212 A | 5/1993 | Fonda |
| 5,221,334 A | 6/1993 | Ma et al. |
| 5,281,682 A | 1/1994 | Cornforth et al. |
| 5,453,121 A | 9/1995 | Nicholls et al. |
| 5,609,671 A | 3/1997 | Nagasawa |
| 5,623,001 A | 4/1997 | Figov |
| 5,662,736 A | 9/1997 | Sakai et al. |
| 5,662,738 A | 9/1997 | Schmid et al. |
| 5,690,723 A | 11/1997 | Sano et al. |
| 5,846,306 A | 12/1998 | Kubota et al. |
| 5,903,290 A | 5/1999 | Nicoloff, Jr. et al. |
| 5,928,419 A | 7/1999 | Uemura et al. |
| 5,952,401 A | 9/1999 | Kimura et al. |
| 5,958,121 A | 9/1999 | Lin |
| 5,976,233 A | 11/1999 | Osumi et al. |
| 6,030,441 A | 2/2000 | Kubota et al. |
| 6,087,416 A | 7/2000 | Pearlstine et al. |
| 6,114,404 A | 9/2000 | Deeken et al. |

(Continued)

FOREIGN PATENT DOCUMENTS

| | | |
|---|---|---|
| CN | 1086637 C | 6/2002 |
| CN | 1398724 A | 2/2003 |

(Continued)

OTHER PUBLICATIONS

Extended European Search Report mailed Dec. 29, 2008, issued on European Patent Application No. 08016440. Radiation Curing in Polymer Science and Technology.
Chemical Revue, 93, 435.
Topics in Current Chemistry, 156, 59.
Topics in Current Chemistry, 168, 1.
Journal of American Chemiistry Society, 112, 6329-6338.
Journal of American Chemistry Society, 102, 3278-3281.
Photoinitiated Polymerization—Theory and Applications.
Journal of American Chemistry Society, 112, 7638-7647.
Prog. Polym. Sci., 21, 1.
Macromol. Symp. 77, 21.
Macromolecules, 29, 3831-3838.
Journal of Photochemistry and Photobiology A:Chemistry, 73, 81-96.
Organic Materials for Imaging, 187-192.
Step et al., Marcomolecules, 1994,27,2529-2539.
Notice of Allowance for U.S. Appl. No. 12/228,224, mailed Oct. 20, 2011.

(Continued)

*Primary Examiner* — Kaj K Olsen
*Assistant Examiner* — Veronica F Faison
(74) *Attorney, Agent, or Firm* — Nutter McClennen & Fish LLP; John J. Penny, Jr.; Lydia G. Olson

(57) ABSTRACT

An inkjet-recording non-aqueous ink composition including a metallic pigment, an organic solvent, and a cellulose acetate butyrate resin having a butyl content of 16.5 to 48%.

15 Claims, No Drawings

U.S. PATENT DOCUMENTS

| | | |
|---|---|---|
| 6,117,606 A | 9/2000 | Macholdt et al. |
| 6,123,759 A | 9/2000 | Mise et al. |
| 6,136,286 A | 10/2000 | Okuyama et al. |
| 6,179,415 B1 | 1/2001 | Okazaki et al. |
| 6,187,897 B1 | 2/2001 | Kawashima et al. |
| 6,300,388 B1 | 10/2001 | Verdonck et al. |
| 6,322,188 B1 | 11/2001 | Sano |
| 6,331,111 B1 | 12/2001 | Cao |
| 6,332,291 B1 | 12/2001 | Flosbach et al. |
| 6,341,841 B1 | 1/2002 | Shimada et al. |
| 6,395,079 B1 | 5/2002 | Sano |
| 6,419,733 B1 | 7/2002 | Sano et al. |
| 6,428,662 B1 | 8/2002 | Woodruff et al. |
| 6,433,038 B1 | 8/2002 | Tanabe et al. |
| 6,444,019 B1 | 9/2002 | Zou et al. |
| 6,488,751 B1 | 12/2002 | Takemoto |
| 6,491,748 B2 | 12/2002 | Watanabe |
| 6,518,370 B2 | 2/2003 | Abuelyaman et al. |
| 6,558,460 B1 | 5/2003 | Walker et al. |
| 6,558,753 B1 | 5/2003 | Ylitalo et al. |
| 6,602,333 B2 | 8/2003 | Miyabayashi |
| 6,637,850 B2 | 10/2003 | Shimada et al. |
| 6,653,367 B2 | 11/2003 | Miyabayashi |
| 6,654,367 B1 | 11/2003 | Kaufman |
| 6,664,306 B2 | 12/2003 | Gaddam et al. |
| 6,726,756 B1 | 4/2004 | Zou et al. |
| 6,793,313 B1 | 9/2004 | Adachi et al. |
| 6,793,318 B2 | 9/2004 | Saksa |
| 6,846,074 B2 | 1/2005 | Hirai |
| 6,846,851 B2 | 1/2005 | Nakhmanovich et al. |
| 6,849,110 B2 | 2/2005 | Sano |
| 6,869,470 B2 | 3/2005 | Kato |
| 6,877,851 B2 | 4/2005 | Watanabe |
| 6,890,049 B2 | 5/2005 | Shimada et al. |
| 6,924,327 B2 | 8/2005 | Sano et al. |
| 6,989,054 B2 | 1/2006 | Tanabe et al. |
| 7,008,475 B2 | 3/2006 | Randler et al. |
| 7,025,449 B2 | 4/2006 | Simons et al. |
| 7,040,747 B2 | 5/2006 | Kubota et al. |
| 7,064,153 B2 | 6/2006 | Bruck |
| 7,156,909 B2 | 1/2007 | Oyanagi et al. |
| 7,259,100 B2 | 8/2007 | Zurcher et al. |
| 7,285,592 B2 | 10/2007 | Harz et al. |
| 7,296,883 B2 | 11/2007 | Kanaya et al. |
| 7,303,619 B2 | 12/2007 | Oyanagi |
| 7,348,128 B2 | 3/2008 | Yamada et al. |
| 7,384,472 B2 | 6/2008 | Schweikart et al. |
| 7,419,255 B2 | 9/2008 | Kawaguchi et al. |
| 7,438,405 B2 | 10/2008 | Ichizawa et al. |
| 7,513,945 B2 | 4/2009 | Nakano et al. |
| 7,538,144 B2 | 5/2009 | Vanmaele et al. |
| 7,581,829 B2 | 9/2009 | Oyanagi et al. |
| 7,591,889 B2 | 9/2009 | Stoffel et al. |
| 7,604,693 B2 * | 10/2009 | Oyanagi et al. ............ 106/31.6 |
| 7,619,015 B2 | 11/2009 | Oyanagi et al. |
| 7,670,418 B2 | 3/2010 | Kato et al. |
| 7,732,505 B2 | 6/2010 | Kito et al. |
| 7,753,514 B2 | 7/2010 | Nakano et al. |
| 7,790,245 B2 | 9/2010 | Oyanagi et al. |
| 7,828,888 B2 * | 11/2010 | Itano et al. ............ 106/31.75 |
| 7,850,280 B2 | 12/2010 | Oyanagi et al. |
| 7,854,798 B2 | 12/2010 | Udagawa et al. |
| 7,855,041 B2 | 12/2010 | Weber et al. |
| 7,866,807 B2 | 1/2011 | Makuta et al. |
| 7,968,621 B2 | 6/2011 | Oyanagi et al. |
| 8,044,116 B2 | 10/2011 | Idemura et al. |
| 2003/0003296 A1 | 1/2003 | Dries et al. |
| 2003/0017353 A1 | 1/2003 | Yamaguchi et al. |
| 2003/0050379 A1 | 3/2003 | Shih et al. |
| 2003/0089271 A1 | 5/2003 | Hirano et al. |
| 2003/0144377 A1 | 7/2003 | Sano et al. |
| 2003/0153649 A1 | 8/2003 | Bromberg |
| 2003/0157356 A1 | 8/2003 | Tamura et al. |
| 2003/0176566 A1 | 9/2003 | Wight et al. |
| 2003/0222959 A1 | 12/2003 | Yamanouchi et al. |
| 2003/0231234 A1 | 12/2003 | Ushirogouchi et al. |
| 2004/0021753 A1 | 2/2004 | Yoshihiro et al. |
| 2004/0069183 A1 | 4/2004 | Kamoto et al. |
| 2004/0257419 A1 | 12/2004 | Iinuma et al. |
| 2004/0266907 A1 | 12/2004 | Sugita et al. |
| 2005/0039631 A1 | 2/2005 | Best et al. |
| 2005/0158524 A1 | 7/2005 | Sloat et al. |
| 2005/0159501 A1 | 7/2005 | Kiefer-Liptak |
| 2005/0176841 A1 | 8/2005 | Krohn |
| 2005/0176847 A1 | 8/2005 | Cagle |
| 2005/0197418 A1 | 9/2005 | Graziano et al. |
| 2005/0197419 A1 | 9/2005 | Graziano et al. |
| 2005/0282930 A1 | 12/2005 | Fu et al. |
| 2006/0009546 A1 | 1/2006 | Brown |
| 2006/0014849 A1 | 1/2006 | Vanmaele et al. |
| 2006/0014850 A1 | 1/2006 | Vanmaele et al. |
| 2006/0036001 A1 | 2/2006 | Oyanagi et al. |
| 2006/0092254 A1 | 5/2006 | Claes et al. |
| 2006/0158493 A1 | 7/2006 | Nakano et al. |
| 2006/0160917 A1 | 7/2006 | Oyanagi et al. |
| 2006/0187285 A1 | 8/2006 | Oyanagi et al. |
| 2006/0189712 A1 | 8/2006 | Kondo |
| 2006/0211788 A1 | 9/2006 | Krohn |
| 2006/0229382 A1 | 10/2006 | Schweikart et al. |
| 2006/0268084 A1 | 11/2006 | Nishizaki et al. |
| 2007/0022547 A1 | 2/2007 | O'Brien |
| 2007/0037961 A1 | 2/2007 | Oyanagi et al. |
| 2007/0044684 A1 | 3/2007 | Nakano et al. |
| 2007/0046720 A1 | 3/2007 | Konno et al. |
| 2007/0060670 A1 | 3/2007 | Ellis |
| 2007/0076069 A1 | 4/2007 | Edwards et al. |
| 2007/0120926 A1 | 5/2007 | Doumaux et al. |
| 2007/0129457 A1 | 6/2007 | Nakano et al. |
| 2007/0142501 A1 | 6/2007 | Oyanagi et al. |
| 2007/0148585 A1 | 6/2007 | Kaneko et al. |
| 2007/0222811 A1 | 9/2007 | Yanagi |
| 2007/0224345 A1 | 9/2007 | Metz et al. |
| 2007/0249750 A1 | 10/2007 | Oyanagi et al. |
| 2007/0281141 A1 | 12/2007 | Kohlweyer |
| 2008/0022893 A1 | 1/2008 | Mizutani |
| 2008/0024577 A1 | 1/2008 | Nakano et al. |
| 2008/0028980 A1 | 2/2008 | Aoki et al. |
| 2008/0081119 A1 | 4/2008 | Oyanagi et al. |
| 2008/0090931 A1 | 4/2008 | Nagvekar et al. |
| 2008/0096998 A1 | 4/2008 | Oyanagi et al. |
| 2008/0098928 A1 | 5/2008 | Oyanagi et al. |
| 2008/0125511 A1 | 5/2008 | Nakano et al. |
| 2008/0132599 A1 | 6/2008 | Nakano et al. |
| 2008/0145628 A1 | 6/2008 | Oyanagi et al. |
| 2008/0146689 A1 | 6/2008 | Oyanagi et al. |
| 2008/0152825 A1 | 6/2008 | Mukai et al. |
| 2008/0152828 A1 | 6/2008 | Mukai et al. |
| 2008/0152877 A1 | 6/2008 | Mukai et al. |
| 2008/0173214 A1 | 7/2008 | Oyanagi et al. |
| 2008/0182083 A1 | 7/2008 | Oyanagi et al. |
| 2008/0182085 A1 | 7/2008 | Oyanagi et al. |
| 2008/0207805 A1 | 8/2008 | Blease et al. |
| 2008/0213518 A1 | 9/2008 | Oyanagi et al. |
| 2008/0233362 A1 | 9/2008 | Kato et al. |
| 2008/0250970 A1 | 10/2008 | Oyanagi et al. |
| 2008/0308004 A1 | 12/2008 | Deroover et al. |
| 2009/0053415 A1 | 2/2009 | Isobe |
| 2009/0075036 A1 | 3/2009 | Itano et al. |
| 2009/0099277 A1 | 4/2009 | Nagvekar et al. |
| 2009/0110827 A1 | 4/2009 | Nakano et al. |
| 2009/0142555 A1 | 6/2009 | Sano et al. |
| 2009/0169834 A1 | 7/2009 | Sano et al. |
| 2009/0208651 A1 | 8/2009 | Oyanagi et al. |
| 2009/0214833 A1 | 8/2009 | Oyanagi et al. |
| 2009/0220695 A1 | 9/2009 | Oyanagi et al. |
| 2009/0233064 A1 | 9/2009 | Yatake et al. |
| 2009/0246479 A1 | 10/2009 | Mukai et al. |
| 2009/0280265 A1 | 11/2009 | Oyanagi et al. |
| 2009/0289973 A1 | 11/2009 | Makuta et al. |
| 2009/0295847 A1 | 12/2009 | Mukai et al. |
| 2010/0009136 A1 | 1/2010 | Oyanagi et al. |
| 2010/0086690 A1 | 4/2010 | Aoki |
| 2010/0086691 A1 | 4/2010 | Mukai et al. |
| 2010/0092674 A1 | 4/2010 | Mukai et al. |
| 2010/0092675 A1 | 4/2010 | Aoki |
| 2011/0036266 A1 | 2/2011 | Oyanagi et al. |
| 2011/0183124 A1 | 7/2011 | Aoki et al. |

| | | | |
|---|---|---|---|
| 2011/0183125 A1 | 7/2011 | Aoki et al. | |
| 2011/0287236 A1 | 11/2011 | Nakano et al. | |
| 2012/0006224 A1 | 1/2012 | Oyanagi et al. | |

FOREIGN PATENT DOCUMENTS

| | | | |
|---|---|---|---|
| CN | 1529740 A | 9/2004 | |
| CN | 1721462 A | 1/2006 | |
| CN | 1771307 A | 5/2006 | |
| DE | 10 2005 021 160 A1 | 11/2006 | |
| EP | 0040721 A2 | 12/1981 | |
| EP | 0042567 A2 | 12/1981 | |
| EP | 0192167 A1 | 8/1986 | |
| EP | 0284561 A2 | 9/1988 | |
| EP | 0 333 224 A2 | 9/1989 | |
| EP | 0 352 821 A1 | 1/1990 | |
| EP | 0372778 A1 | 6/1990 | |
| EP | 00400721 A2 | 12/1990 | |
| EP | 0 894 835 A2 | 2/1999 | |
| EP | 0 997 507 A1 | 5/2000 | |
| EP | 1045013 A1 | 10/2000 | |
| EP | 1 260 563 A1 | 11/2002 | |
| EP | 1 295 916 A1 | 3/2003 | |
| EP | 1422072 A1 | 5/2004 | |
| EP | 1 452 569 A1 | 9/2004 | |
| EP | 1 614 730 A1 | 1/2006 | |
| EP | 1 616 920 A1 | 1/2006 | |
| EP | 1 616 921 A1 | 1/2006 | |
| EP | 1 674 499 A1 | 6/2006 | |
| EP | 1 752 504 A1 | 2/2007 | |
| EP | 1 806 387 A1 | 7/2007 | |
| EP | 1 815 978 A1 | 8/2007 | |
| EP | 1 837 381 A1 | 9/2007 | |
| EP | 1862511 A1 | 12/2007 | |
| EP | 1892105 A1 | 2/2008 | |
| EP | 1942157 A2 | 7/2008 | |
| EP | 1942157 A3 | 7/2008 | |
| EP | 1942158 A2 | 7/2008 | |
| EP | 1942158 A3 | 7/2008 | |
| EP | 1947151 A1 | 7/2008 | |
| EP | 1950260 A1 | 7/2008 | |
| GB | 1276369 A | 6/1972 | |
| GB | 1 547 283 A | 6/1979 | |
| GB | 2 029 433 A | 3/1980 | |
| GB | 2172655 A | 9/1986 | |
| GB | 2367299 A | 4/2002 | |
| JP | 47-003981 B | 2/1972 | |
| JP | 47-006416 B | 2/1972 | |
| JP | 47-022326 B | 6/1972 | |
| JP | 47-023664 B | 7/1972 | |
| JP | 56-028256 A | 3/1981 | |
| JP | 57-030704 A | 2/1982 | |
| JP | 59-042864 B | 3/1984 | |
| JP | 60-026403 B | 2/1985 | |
| JP | 60-026483 B | 2/1985 | |
| JP | 61-194062 A | 8/1986 | |
| JP | 62-001426 A | 1/1987 | |
| JP | 62-081345 A | 4/1987 | |
| JP | 63-061950 B | 3/1988 | |
| JP | 01-034242 B | 2/1989 | |
| JP | 01-238656 A | 9/1989 | |
| JP | 02-009596 B | 1/1990 | |
| JP | 02-009597 B | 1/1990 | |
| JP | 02-211452 A | 8/1990 | |
| JP | 3033093 B | 2/1991 | |
| JP | 03-056573 A | 3/1991 | |
| JP | 03-079678 A | 4/1991 | |
| JP | 03-160068 A | 7/1991 | |
| JP | 2867491 B | 7/1991 | |
| JP | 03-216379 A | 9/1991 | |
| JP | 04-018462 A | 1/1992 | |
| JP | 05-186725 A | 7/1993 | |
| JP | 07-258578 A | 10/1995 | |
| JP | 08-003498 A | 1/1996 | |
| JP | 08-218018 A | 8/1996 | |
| JP | 08-283596 A | 10/1996 | |
| JP | 08-295836 A | 11/1996 | |
| JP | 10-110110 A | 4/1998 | |
| JP | 10-110111 A | 4/1998 | |
| JP | 10-110114 A | 4/1998 | |
| JP | 10-120956 A | 5/1998 | |
| JP | 10-120958 A | 5/1998 | |
| JP | 10-195331 A | 7/1998 | |
| JP | 10-195360 A | 7/1998 | |
| JP | 10-237349 A | 9/1998 | |
| JP | 10-287035 A | 10/1998 | |
| JP | 10-330665 A | 12/1998 | |
| JP | 11-011002 A | 1/1999 | |
| JP | 11165420 A | 6/1999 | |
| JP | 11-202558 A | 7/1999 | |
| JP | 11193316 A | 7/1999 | |
| JP | 11-343436 A | 12/1999 | |
| JP | 2000-044858 A | 2/2000 | |
| JP | 2000044861 A | 2/2000 | |
| JP | 2000-336295 A | 12/2000 | |
| JP | 2000-345080 A | 12/2000 | |
| JP | 2000-355667 A | 12/2000 | |
| JP | 2001-348519 A | 12/2001 | |
| JP | 2002-038063 A | 2/2002 | |
| JP | 2002-179960 A | 6/2002 | |
| JP | 2002-225414 A | 8/2002 | |
| JP | 2002-249165 A | 9/2002 | |
| JP | 2002-256189 A | 9/2002 | |
| JP | 2002-529572 A | 9/2002 | |
| JP | 2002-292775 A | 10/2002 | |
| JP | 2002-332436 A | 11/2002 | |
| JP | 2002-348513 A | 12/2002 | |
| JP | 2003-012971 A | 1/2003 | |
| JP | 2003-055463 A | 2/2003 | |
| JP | 2003-055563 A | 2/2003 | |
| JP | 2003-096337 A | 4/2003 | |
| JP | 2003-147233 A | 5/2003 | |
| JP | 2003-253148 A | 9/2003 | |
| JP | 2003-292836 A | 10/2003 | |
| JP | 2003-292857 A | 10/2003 | |
| JP | 2003-306625 A | 10/2003 | |
| JP | 2003-311945 A | 11/2003 | |
| JP | 2003-342499 A | 12/2003 | |
| JP | 2004-009360 A | 1/2004 | |
| JP | 2004-018716 A | 1/2004 | |
| JP | 2004009359 A | 1/2004 | |
| JP | 2004-059857 A | 2/2004 | |
| JP | 2004-066817 A | 3/2004 | |
| JP | 2004099796 A | 4/2004 | |
| JP | 2004-161852 A | 6/2004 | |
| JP | 2004-174971 A | 6/2004 | |
| JP | 2004195797 A | 7/2004 | |
| JP | 2004197055 A | 7/2004 | |
| JP | 2004-216654 A | 8/2004 | |
| JP | 2004-250659 A | 9/2004 | |
| JP | 2004-263139 A | 9/2004 | |
| JP | 2004-264435 A | 9/2004 | |
| JP | 2004-535506 A | 11/2004 | |
| JP | 2004-359960 A | 12/2004 | |
| JP | 2005-007577 A | 1/2005 | |
| JP | 2005-015813 A | 1/2005 | |
| JP | 2005-023299 A | 1/2005 | |
| JP | 2005008690 A | 1/2005 | |
| JP | 2005023284 A | 1/2005 | |
| JP | 2005-036079 A | 2/2005 | |
| JP | 2005-060411 A | 3/2005 | |
| JP | 2005-060419 A | 3/2005 | |
| JP | 2005-068252 A | 3/2005 | |
| JP | 2005-068439 A | 3/2005 | |
| JP | 2005068250 A | 3/2005 | |
| JP | 2005068251 A | 3/2005 | |
| JP | 2005-096254 A | 4/2005 | |
| JP | 2005-161583 A | 6/2005 | |
| JP | 2005187659 A | 7/2005 | |
| JP | 2005-220352 A | 8/2005 | |
| JP | 2005-290362 A | 10/2005 | |
| JP | 2005-298757 A | 10/2005 | |
| JP | 2005-314655 A | 11/2005 | |
| JP | 2005-350551 A | 12/2005 | |
| JP | 2005-536375 A | 12/2005 | |
| JP | 2006-070255 A | 3/2006 | |
| JP | 2006-117795 A | 5/2006 | |
| JP | 2006-117931 A | 5/2006 | |
| JP | 2006-123529 A | 5/2006 | |

| | | | |
|---|---|---|---|
| JP | 2006-123542 A | 5/2006 | |
| JP | 2006137183 A | 6/2006 | |
| JP | 2006-176734 A | 7/2006 | |
| JP | 2006-199929 A | 8/2006 | |
| JP | 2006-206875 A | 8/2006 | |
| JP | 2006-241194 A | 9/2006 | |
| JP | 2006-257302 A | 9/2006 | |
| JP | 2006-257303 A | 9/2006 | |
| JP | 2006-265292 A | 10/2006 | |
| JP | 2006-272933 A | 10/2006 | |
| JP | 2006-274025 A | 10/2006 | |
| JP | 2006-274029 A | 10/2006 | |
| JP | 2006-281538 A | 10/2006 | |
| JP | 2006-281568 A | 10/2006 | |
| JP | 2006-281570 A | 10/2006 | |
| JP | 2006-282822 A | 10/2006 | |
| JP | 2006-282823 A | 10/2006 | |
| JP | 2006-283017 A | 10/2006 | |
| JP | 2006-523762 A | 10/2006 | |
| JP | 2006265524 A | 10/2006 | |
| JP | 2006312711 A | 11/2006 | |
| JP | 2007-016103 A | 1/2007 | |
| JP | 2007-023161 A | 2/2007 | |
| JP | 2007-045989 A | 2/2007 | |
| JP | 2007-045990 A | 2/2007 | |
| JP | 2007046034 A | 2/2007 | |
| JP | 2007-055084 A | 3/2007 | |
| JP | 2007-100053 A | 4/2007 | |
| JP | 2007-100054 A | 4/2007 | |
| JP | 2007-112970 A | 5/2007 | |
| JP | 2007131741 A | 5/2007 | |
| JP | 2007-138084 A | 6/2007 | |
| JP | 2007-154087 A | 6/2007 | |
| JP | 2007-169306 A | 7/2007 | |
| JP | 2007-169307 A | 7/2007 | |
| JP | 2007-169308 A | 7/2007 | |
| JP | 2007-182535 A | 7/2007 | |
| JP | 2007-182536 A | 7/2007 | |
| JP | 2007-191613 B1 | 7/2007 | |
| JP | 2007169451 A | 7/2007 | |
| JP | 2007-211036 A | 8/2007 | |
| JP | 2007-254735 A | 10/2007 | |
| JP | 2007-262272 A | 10/2007 | |
| JP | 2007-269017 A | 10/2007 | |
| JP | 2007-270085 A | 10/2007 | |
| JP | 2007-297586 A | 11/2007 | |
| JP | 2008-075067 A | 4/2008 | |
| JP | 2008-103045 A | 6/2008 | |
| JP | 2008-155523 A | 7/2008 | |
| JP | 2008-155524 A | 7/2008 | |
| JP | 2009-113494 A | 5/2009 | |
| JP | 2009-114454 A | 5/2009 | |
| JP | 2009-242441 A | 10/2009 | |
| JP | 2010-006062 A | 1/2010 | |
| JP | 2010-090270 A | 4/2010 | |
| JP | 2010-090271 A | 4/2010 | |
| JP | 2010-094809 A | 4/2010 | |
| JP | 2010-094852 A | 4/2010 | |
| WO | 93/21235 A1 | 10/1993 | |
| WO | 9905230 A1 | 2/1999 | |
| WO | 00/52530 A1 | 9/2000 | |
| WO | 01/08895 A1 | 2/2001 | |
| WO | 02/38687 A1 | 5/2002 | |
| WO | 02055619 | 7/2002 | |
| WO | 02/076764 A2 | 10/2002 | |
| WO | 2004/018197 A1 | 3/2004 | |
| WO | 2004/031308 A1 | 4/2004 | |
| WO | 2004/052947 A1 | 6/2004 | |
| WO | 2004/094534 A1 | 11/2004 | |
| WO | 2004/104051 A1 | 12/2004 | |
| WO | 2005/047405 A1 | 5/2005 | |
| WO | 2005061566 A1 | 7/2005 | |
| WO | 2005/089957 A1 | 9/2005 | |
| WO | 2005/095006 A1 | 10/2005 | |
| WO | 2006/085992 A2 | 8/2006 | |
| WO | 2006/087930 A1 | 8/2006 | |
| WO | 2006/098676 A1 | 9/2006 | |
| WO | 2006101054 A1 | 9/2006 | |
| WO | 2006112031 A1 | 10/2006 | |
| WO | 2007/026355 A2 | 3/2007 | |
| WO | 2007/026366 A1 | 3/2007 | |
| WO | 2007060264 A2 | 5/2007 | |

OTHER PUBLICATIONS

Non-final Office Action for U.S. Appl. No. 12/228,224, mailed Jun. 2, 2011.
Final Office Action for U.S. Appl. No. 12/228,193, mailed Oct. 14, 2011.
Non-final Office Action for U.S. Appl. No. 12/228,193, mailed Jun. 2, 2011.
Extended European Search Report issued Nov. 2, 2011 for Application No. 11177753.8 (6 Pages).
U.S. Office Action issued Dec. 21, 2011 for U.S. Appl. No. 12/074,308 (16 Pages).
U.S. Office Action for U.S. Appl. No. 12/228,193, mailed Mar. 8, 2012 (8 pages).
U.S. Office Action issued Jan. 6, 2012 for U.S. Appl. No. 13/197,174 (8 Pages).
U.S. Office Action issued Dec. 12, 2011 for U.S. Appl. No. 13/240,667 (14 Pages).
U.S. Office Action issued Jun. 8, 2012 for U.S. Appl. No. 12/074,308 (25 Pages).
U.S. Supplemental Notice of Allowance issued Jun. 28, 2012 for U.S. Appl. No. 12/228,224 (2 Pages).
U.S. Office Action issued Apr. 26, 2012 for U.S. Appl. No. 12/394,336 (13 Pages).
Ciba DAROCUR EDB. Photoinitiator. Ciba Specialty Chemicals, Inc., Coating Effects. Feb. 20, 2003. 2 pages.
Ciba IRGACURE 369. Photoinitiator. Ciba Specialty Chemicals, Inc., Coating Effects Segment. Sep. 4, 2001. 3 pages.
Ciba IRGACURE 819. Photoinitiator. Ciba Specialty Chemicals Inc., Coating Effects Segment. Aug. 30, 2001, 3 pages.
Ciba IRGASTAB UV 22. Next gerneration in-can stabilizer for outstanding stabilization performance of UV inks and coatings. Ciba Specialty Chemicals Inc. 2006, 2 pages.
Dispersion. Definition. Hawley's Condensed Chemical Dictionary [Online]. 2007, 1 page. Retrieved Oct. 22, 2010.
Dispersion (chemistry). Definition. Wikipedia. Last Modified Oct. 22, 2010. 2 pages. Retrieved Oct. 25, 2010 from <http://en.wikipedia.org/w/index.php?title=Dispersion (chemistry)&printable=yes>.
IRGACURE 127. Photoinitiator. Ciba Specialty Chemicals Inc., Coating Effects Segment. Apr. 9, 2004, 4 pages.
Laromer UA 9209 V. Technical Information. BASF Aktiengesellschaft. EVP 009403 e, Rev. 0, Dec. 2003. 4 pages.
BYK-UV 3500 BYK-UV 3510 BYK-UV 3530 BYK-UV-3570. Surface Additives for Radiation Curable Systems. BYK Additives & Instruments. Issue 7/08. BYK-Chemie GmbH, Germany. 4 pages.
Chinese Office Action issued Nov. 30, 2010 for Application No. 200910004654.0 (5 Pages).
European Search Report issued Apr. 21, 2008 for Application No. 07024545.1.
International Search Report mailed Sep. 16, 2008 from Related International Application No. PCT/JP2008/064126. (2 pages).
Japanese Office Action issued May 25, 2011 for Application No. 2007-304874 (2 Pages).
Japanese Office Action issued Mar. 9, 2011 for Application No. 2007-316368 (2 Pages).
Chinese Office Action issued Nov. 30, 2010 for Application No. 200910004654.0 (11 Pages).
Japanese Office Action issued May 25, 2011 for Application No. 2007-304874 (8 Pages).
Japanese Office Action issued Mar. 9, 2011 for Application No. 2007-316368 (9 Pages).
Extended European Search Report issued May 11, 2011 for Application No. 11152226.4 (4 Pages).

\* cited by examiner even though # INKJET-RECORDING NON-AQUEOUS INK COMPOSITION, INKJET RECORDING METHOD, AND RECORDED MATTER Japanese Patent Application No. 2007-240669, filed on Sep. 18, 2007, Japanese Patent Application No. 2008-73058, filed on Mar. 21, 2008, and Japanese Patent Application No. 2008-200353, filed on Aug. 4, 2008, are hereby incorporated by reference in their entirety.

BACKGROUND OF THE INVENTION

The present invention relates to an inkjet-recording non-aqueous ink composition, an inkjet recording method, and a recorded matter.

A commercially-available aluminum pigment has an average particle diameter of 10 micrometers or more (see U.S. Pat. No. 4,233,195, and U.S. Pat. No. 5,662,738, for example). Therefore, it is very difficult to cause the aluminum pigment to pass through a minute nozzle (diameter: 30 micrometers or less) of an inkjet printer or a filter. When the average particle diameter of the aluminum pigment is reduced, the aluminum pigment reacts with water due to an increase in surface area. It is very difficult to obtain an aluminum pigment having an average particle diameter of 1 micrometer or less using a grinding method or an atomization method. In order to solve such a problem, a tabular aluminum pigment which can be used for an inkjet ink has been proposed (see JP-A-2007-131741, for example).

The viscosity of an inkjet-recording ink composition must be adjusted to an appropriate level in order to discharge a constant amount of ink onto a recording medium. When using a non-aqueous ink composition, an organic solvent having a high viscosity, a resin, or an emulsion in which a resin is dispersed is normally added to the ink composition as a viscosity controller. However, when adding an organic solvent having a high viscosity to a non-aqueous ink composition containing a metallic pigment, a considerable period of time is required for the ink to be dried on a recording medium. Moreover, the ink fixation capability deteriorates. When adding a resin or an emulsion in which a resin is dispersed to an ink composition containing a metallic pigment, the metallic glossiness and the ink discharge stability deteriorate.

When printing an image on a printing medium using an inkjet printer by utilizing a tabular aluminum pigment, since the orientation of the pigment during and after drying of the ink changes depending on the printing environment, the original glossiness of the ink may not be obtained depending on the printing environment. As a result, the printing area may not exhibit sufficient glossiness.

SUMMARY

According to a first aspect of the invention, there is provided an inkjet-recording non-aqueous ink composition comprising:
a metallic pigment;
an organic solvent; and
a cellulose acetate butyrate resin having a butyl content of 16.5 to 48%.

According to a second aspect of the invention, there is provided an inkjet recording method comprising:
discharging droplets of the above-described inkjet-recording non-aqueous ink composition to a recording medium to print a metallic glossy image.

According to a third aspect of the invention, there is provided a recorded matter comprising a metallic glossy image recorded by the above-described inkjet recording method.

DETAILED DESCRIPTION OF THE EMBODIMENT

The invention may provide an inkjet-recording non-aqueous ink composition exhibiting excellent ink discharge stability and drying capability on a recording medium, and being able to form an image with clear metallic glossiness, although the inkjet-recording non-aqueous ink composition is a non-aqueous metallic pigment ink composition having a viscosity adjusted by adding a resin.

The invention may also provide an inkjet recording method using the above non-aqueous ink composition, enabling to sufficiently exhibit and maintain excellent metallic specular glossiness of the non-aqueous ink composition.

According to one embodiment of the invention, there is provided an inkjet-recording non-aqueous ink composition comprising:
a metallic pigment;
an organic solvent; and
a cellulose acetate butyrate resin having a butyl content of 16.5 to 48%.

In this inkjet-recording non-aqueous ink composition, the butyl content of the cellulose acetate butyrate resin may be 16.5 to 39%.

In this inkjet-recording non-aqueous ink composition,
the metallic pigment may be tabular particles; and
when a major axis, a minor axis, and a thickness of each of the tabular particles in a plane are respectively referred to as X, Y, and Z, the tabular particles may have a circle-equivalent 50% average particle diameter R50 determined based on an X-Y plane area of 0.5 to 3 micrometers, and R50/Z>5 may be satisfied.

In this inkjet-recording non-aqueous ink composition, the metallic pigment may be aluminum or an aluminum alloy.

In this inkjet-recording non-aqueous ink composition, the concentration of the metallic pigment may range from 0.5 to 3.0 mass %.

In this inkjet-recording non-aqueous ink composition, the organic solvent may contain at least one compound selected from an alkylene glycol compound and a lactone.

In this inkjet-recording non-aqueous ink composition, the alkylene glycol compound may be at least one compound selected from an ethylene glycol compound and a propylene glycol compound.

In this inkjet-recording non-aqueous ink composition, the lactone may be at least one compound selected from beta-propiolactone, beta-butyrolactone, gamma-butyrolactone, gamma-valerolactone, delta-valerolactone, and epsilon-caprolactone.

In this inkjet-recording non-aqueous ink composition, the cellulose acetate butyrate resin may have a weight average molecular weight of 60,000 to 90,000.

According to one embodiment of the invention, there is provided an inkjet recording method comprising:
discharging droplets of the above-described inkjet-recording non-aqueous ink composition to a recording medium to print a metallic glossy image.

In this inkjet recording method, the recording medium may be a film of a material selected from polyvinyl chloride, polyethylene terephthalate, polyethylene, polyvinylidene chloride, polyvinyl alcohol, polyester, polycarbonate, polyacrylonitrile, cellophane, nylon, an ethylene-vinyl acetate copolymer, an ethylene-vinyl alcohol copolymer, and an ethylene-methacrylic acid copolymer.

In this inkjet recording method, an ink-receiving layer that contains a resin may be formed on a printing-side outermost surface of the recording medium.

In this inkjet recording method, a drying temperature during printing may be 8 to 40° C.

According to one embodiment of the invention, there is provided a recorded matter comprising a metallic glossy image recorded by the above-described inkjet recording method.

The non-aqueous ink composition according to the above embodiment comprises a metallic pigment, an organic solvent, and a cellulose acetate butyrate resin having a butyl content of 16.5 to 48%. Preferred embodiments of the invention are described in detail below.

1. INKJET-RECORDING NON-AQUEOUS INK COMPOSITION

1.1 Metallic Pigment

A non-aqueous ink composition according to one embodiment of the invention includes a metallic pigment.

The metallic pigment is tabular particles prepared by fracturing a deposited metal film. When the major axis, the minor axis, and the thickness of the tabular particles in a plane are respectively referred to as X, Y, and Z, it is preferable that the tabular particles have a circle-equivalent 50% average particle diameter R50 determined based on the X-Y plane area of 0.5 to 3 micrometers and R50/Z>5 be satisfied.

The term "tabular particle" used herein refers to a particle that has an approximately flat surface (X-Y plane) and an approximately uniform thickness (Z). Since the tabular particles are prepared by fracturing a deposited metal film, the resulting metal particles have an approximately flat surface and an approximately uniform thickness. Therefore, the major axis X, the minor axis Y, and the thickness Z of the tabular particles in a plane can be defined.

The term "circle equivalent diameter" used herein refers to the diameter of a circle when the approximately flat surface (X-Y plane) of the tabular particles of the metallic pigment is a circle having the same projection area as that of the tabular particles of the metallic pigment. For example, when the approximately flat surface (X-Y plane) of the tabular particles of the metallic pigment is a polygon, the diameter of a circle obtained by converting the plane of projection of the polygon into a circle is referred to as the circle equivalent diameter of the tabular particles of the metallic pigment.

The circle-equivalent 50% average particle diameter R50 of the tabular particles determined based on the X-Y plane area is preferably 0.5 to 3 micrometers, and particularly preferably 0.75 to 2 micrometers from the viewpoint of metallic glossiness and print stability. If the 50% average particle diameter R50 is less than 0.5 micrometers, metallic glossiness may be insufficient. If the 50% average particle diameter R50 is more than 3 micrometers, print stability may deteriorate.

Regarding the relationship between the circle-equivalent 50% average particle diameter R50 and the thickness Z, it is preferable that R50/Z>5 be satisfied in order to provide excellent metallic glossiness. If the ratio R50/Z is five or less, metallic glossiness may be insufficient.

The circle-equivalent maximum particle diameter Rmax of the tabular particles determined based on the X-Y plane area is preferably 10 micrometers or less in order to prevent a situation in which the resulting ink composition clogs an inkjet recording device. If the circle-equivalent maximum particle diameter Rmax of the tabular particles is 10 micrometers or less; clogging of a nozzle of an inkjet recording device, clogging of a foreign object removal filter provided in an ink passage, or the like can be prevented.

It is preferable that the metallic pigment be aluminum or an aluminum alloy from the viewpoint of cost and metallic glossiness. When using an aluminum alloy, a metal element or a nonmetallic element that may be added to aluminum is not particularly limited insofar as the element has metallic glossiness or the like. Examples of such a metal element include silver, gold; platinum, nickel, chromium, tin, zinc, indium, titanium, copper, and the like. At least one of these elements, alloys of these elements, and a mixture of these elements is suitably used.

The metallic pigment is produced as follows, for example. A metallic pigment raw material having a structure in which a release resin layer and a metal or alloy layer are sequentially stacked on the surface of a sheet-like substrate is provided. The metal or alloy layer is removed from the sheet-like substrate at the interface between the metal or alloy layer and the release resin layer, and is then ground to obtain tabular particles. The major axis X, the minor axis Y, and the circle equivalent diameter of the resulting tabular particles in a plane may be measured using a particle image analyzer. As the particle image analyzer, a flow particle image analyzer "FPIA-2100", "FPIA-3000", or "FPIA-3000S" (manufactured by Sysmex Corporation) may be used, for example.

The particle size distribution (CV value) of the metallic pigment (tabular particles) is calculated by the following equation (1).

$$CV \text{ value} = \text{standard deviation of particle size distribution}/\text{average particle diameter} \times 100 \quad (1)$$

The CV value is preferably 60 or less, more preferably 50 or less, and particularly preferably 40 or less. Excellent print stability can be achieved by utilizing a metallic pigment having a CV value of 60 or less.

The metal or alloy layer is preferably formed by vacuum deposition, ion plating, or sputtering.

The thickness of the metal or alloy layer is 20 to 100 nm. A metallic pigment having an average thickness of 20 to 100 nm is thus obtained. If the metallic pigment has an average thickness of 20 nm or more, the metallic pigment exhibits excellent reflectivity and brilliance. If the metallic pigment has an average thickness of 100 nm or less, an increase in apparent specific gravity is suppressed so that the dispersion stability of the metallic pigment can be ensured.

The release resin layer used for the metallic pigment raw material is an undercoat layer for the metal or alloy layer. The release resin layer serves as a releasable layer that improves the releasability of the metal or alloy layer from the surface of the sheet-like substrate. As the resin used for the release resin layer, polyvinyl alcohol, polyvinyl butyral, polyethylene glycol, polyacrylic acid, polyacrylamide, a cellulose derivative, an acrylic polymer, or a modified nylon resin is preferable, for example.

A solution of one of the above-mentioned resins or a mixture of two or more of the above-mentioned resins is applied to a recording medium and is then dried to form a layer, for example. An additive such as a viscosity controller may be added after application.

The release resin layer is formed by gravure coating, roll coating, blade coating, extrusion coating, dip coating, spin coating, or the like. After application and drying, the surface of the release resin layer is smoothed by calendering, if necessary.

The thickness of the release resin layer is preferably 0.5 to 50 micrometers, and more preferably 1 to 10 micrometers, although the thickness of the release resin layer is not particularly limited. If the thickness of the release resin layer is less than 0.5 micrometers, the amount of dispersion resin may be insufficient. If the thickness of the release resin layer is more than 50 micrometers, the release resin layer may be easily removed from the pigment layer at the interface when rolled.

The sheet-like substrate is not particularly limited. Examples of the sheet-like substrate include releasable films such as a polyester film formed of polytetrafluoroethylene, polyethylene, polypropylene, polyethylene terephthalate, or the like, a polyamide film formed of nylon 66, nylon 6, or the like, a polycarbonate film, a triacetate film, and a polyimide film. The sheet-like substrate is preferably formed of polyethylene terephthalate or its copolymer.

The thickness of the sheet-like substrate is preferably 10 to 150 micrometers, although the thickness of the sheet-like substrate is not particularly limited. If the thickness of the sheet-like substrate is 10 micrometers or more, excellent handling properties are achieved. If the thickness of the sheet-like substrate is 150 micrometers or less, the sheet-like substrate is flexible so that the sheet-like substrate can be easily rolled and separated, for example.

The metal or alloy layer may be provided with a protective layer, as disclosed in JP-A-2005-68250. Examples of the protective layer include a silicon oxide layer and a protective resin layer.

The silicon oxide layer is not particularly limited insofar as the silicon oxide layer contains silicon oxide. For example, the silicon oxide layer is preferably formed of a silicon alkoxide (e.g., tetraalkoxysilane) or its polymer using a sol-gel method.

The protective resin layer is not particularly limited insofar as the protective resin layer is formed of a resin that is not dissolved in a dispersion medium. Examples of such a resin include polyvinyl alcohol, polyethylene glycol, polyacrylic acid, polyacrylamide, a cellulose derivative, and the like. The protective resin layer is preferably formed of polyvinyl alcohol or a cellulose derivative.

A solution of one of the above-mentioned resins or a mixture of two or more of the above-mentioned resins is applied and dried to form a layer, for example. An additive such as a viscosity controller may be added to the coating liquid.

The silicon oxide layer or the protective resin layer is formed in the same manner as the release resin layer.

The thickness of the protective layer is preferably 50 to 150 nm, although the thickness of the protective layer is not particularly limited. If the thickness of the protective layer is less than 50 nm, the protective layer may exhibit insufficient mechanical strength. If the thickness of the protective layer is more than 150 nm, it may be difficult to grind and disperse the protective layer due to an increased in strength. Moreover, the protective layer may be removed from the metal or alloy layer at the interface.

A color material layer may be provided between the protective layer and the metal or alloy layer, as disclosed in JP-A-2005-68251.

The color material layer is provided in order to obtain a composite pigment of an arbitrary color. The color material layer is not particularly limited insofar as the color material layer contains a color material that can provide the metallic pigment used in this embodiment with an arbitrary color tone and hue in addition to metallic glossiness and brilliance. The color material used for the color material layer may be a dye or a pigment. A known dye or pigment may be used appropriately.

In this case, the term "pigment" used for the color material layer refers to a natural pigment, a synthetic organic pigment, a synthetic inorganic pigment, and the like defined in the field of engineering, but differs from a pigment processed for a stacked structure such as the metallic pigment raw material according to this embodiment.

The color material layer is preferably formed by coating, although the formation method is not particularly limited.

When the color material used for the color material layer is a pigment, the color material layer preferably further includes a color material dispersion resin. In this case, the pigment, the color material dispersion resin, an optional additive, and the like are dispersed or dissolved in a solvent. The solution is then spin-coated to form a uniform liquid film. The liquid film is then dried to form a thin resin film.

When producing the metallic pigment raw material, the color material layer and the protective layer are preferably formed by coating from the viewpoint of efficiency.

The metallic pigment raw material may have a layer configuration that includes a plurality of stacked structures formed of the release resin layer, the metal or alloy layer, and the protective layer. The total thickness of the stacked structure of a plurality of metal or alloy layers (i.e., the thickness of metal or alloy layer-release resin layer-metal or alloy layer or release resin layer-metal or alloy layer excluding the sheet-like substrate and the release resin layer directly formed on the sheet-like substrate) is preferably 5000 nm or less. If the total thickness of the stacked structure of a plurality of metal or alloy layers is 5000 nm or less, cracks or separation rarely occurs even if the metallic pigment raw material is rolled (i.e., excellent storage stability is obtained). Moreover, the resulting pigment exhibits excellent brilliance.

A structure in which the release resin layer and the metal or alloy layer are stacked on each side of the sheet-like substrate may also be employed, for example.

The metal or alloy layer is preferably removed from the sheet-like substrate by immersing the metallic pigment raw material in a liquid, or immersing the metallic pigment raw material in a liquid while applying ultrasonic waves to grind the metallic pigment raw material, for example.

A stable liquid dispersion can be obtained by merely dispersing the pigment thus obtained in the solvent, since the release resin layer serves as a protective colloid. In an ink composition using the pigment, the resin contained in the release resin layer provides adhesion to a recording medium (e.g., paper).

The concentration of the metallic pigment is preferably 0.1 to 5.0 mass %, more preferably 0.25 to 2.5 mass %, and particularly preferably 0.5 to 2.0 mass % based on the total mass of the ink composition.

1.2 Organic Solvent

The non-aqueous ink composition according to this embodiment includes an organic solvent. As the organic solvent, at least one compound selected from an alkylene glycol compound and a lactone that are liquid at normal temperature and normal pressure is preferable. It is more preferable that the non-aqueous ink composition include an alkylene glycol compound that is liquid at normal temperature and normal pressure.

The alkylene glycol compound is preferably an ethylene glycol compound or a propylene glycol compound disclosed in WO2002/055619.

Examples of the ethylene glycol compound include ethylene glycol, diethylene glycol, triethylene glycol, tetraethylene glycol, polyethylene glycol monoether, and polyethylene glycol diether. Among these, diethylene glycol is preferable.

Examples of the propylene glycol compound include propylene glycol, dipropylene glycol, tripropylene glycol, polypropylene glycol monoether, and polypropylene glycol diether. Among these, dipropylene glycol is preferable.

A diethylene glycol compound shown by the following general formula (2) may be used as the diethylene glycol compound, for example.

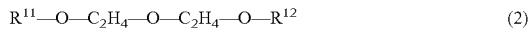

$$R^{11}-O-C_2H_4-O-C_2H_4-O-R^{12} \quad (2)$$

wherein $R^{11}$ and $R^{12}$ individually represent a hydrogen atom, an alkyl group having 1 to 4 carbon atoms, or an $R^{13}CO$ group (wherein $R^{13}$ represents an alkyl group having 1 to 4 carbon atoms.

The term "alkyl group having 1 to 4 carbon atoms" used herein refers to a linear or branched alkyl group. Examples of the alkyl group having 1 to 4 carbon atoms include a methyl group, an ethyl group, an n-propyl group, an iso-propyl group, an n-butyl group, an iso-butyl group, a sec-butyl group, and a tert-butyl group.

Examples of the diethylene glycol compound include diethylene glycol; diethylene glycol ethers (particularly alkyl ethers) such as diethylene glycol monomethyl ether, diethylene glycol dimethyl ether, diethylene glycol methylethyl ether, diethylene glycol monoethyl ether, diethylene glycol diethyl ether, diethylene glycol mono-n-butyl ether, and diethylene glycol di-n-butyl ether; and diethylene glycol esters such as diethylene glycol monoethyl ether acetate, diethylene glycol mono-n-butyl ether acetate, and diethylene glycol monoacetate. Among these, diethylene glycol, diethylene glycol monomethyl ether, diethylene glycol monoethyl ether, diethylene glycol diethyl ether, diethylene glycol mono-n-butyl ether, diethylene glycol di-n-butyl ether, diethylene glycol monoethyl ether acetate, or diethylene glycol monobutyl ether acetate is preferable.

A dipropylene glycol compound shown by the following general formula (3) may be used as the dipropylene glycol compound, for example.

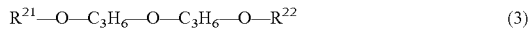

$$R^{21}-O-C_3H_6-O-C_3H_6-O-R^{22} \quad (3)$$

wherein $R^{21}$ and $R^{22}$ individually represent a hydrogen atom, an alkyl group having 1 to 4 carbon atoms, or an $R^{23}CO$ group (wherein $R^{23}$ represents an alkyl group having 1 to 4 carbon atoms.

Examples of the dipropylene glycol compound include dipropylene glycol; and dipropylene glycol ethers (particularly alkyl ethers) such as dipropylene glycol monomethyl ether and dipropylene glycol monoethyl ether.

The lactone is preferably a lactone having six or less carbon atoms. Among these, beta-propiolactone, beta-butyrolactone, gamma-butyrolactone, gamma-valerolactone, delta-valerolactone, or epsilon-caprolactone is preferable.

It is preferable that the diethylene glycol compound, the dipropylene glycol compound, and the lactone have a boiling point of 150° C. or more, and more preferably 180° C. or more at normal pressure.

It is preferable that the diethylene glycol compound and the dipropylene glycol compound have a vapor pressure at 20° C. of 1 hPa or less, and more preferably 0.7 hPa or less. When using a diethylene glycol compound or a dipropylene glycol compound that has a high boiling point and a low vapor pressure within the above-mentioned range, it is unnecessary to provide a local exhaust facility or an exhaust gas treatment facility so that the working environment can be improved. Moreover, an environmental impact can be reduced.

The non-aqueous ink composition used in this embodiment preferably includes the diethylene glycol compound. The content of the diethylene glycol compound may be appropriately selected depending on the desired print characteristics. The content of the diethylene glycol compound is preferably 20 to 80 mass % based on the total mass of the ink composition.

The non-aqueous ink composition used in this embodiment may include a polyethylene glycol monoether compound that is liquid at normal temperature and normal pressure and shown by the following general formula (4) as the organic solvent in addition to the diethylene glycol compound, the dipropylene glycol compound, the lactone, or a mixture of these compounds.

$$R^{31}-O-(C_2H_4-O)_n-H \quad (4)$$

wherein $R^{31}$ represents an alkyl group having 1 to 6 (preferably 1 to 4) carbon atoms, and n is an integer from 3 to 6.

The term "alkyl group having 1 to 6 carbon atoms" used herein refers to a linear or branched alkyl group. Examples of the alkyl group having 1 to 6 carbon atoms include a linear or branched pentyl group and a linear or branched hexyl group in addition to the groups illustrated above for the alkyl group having 1 to 4 carbon atoms.

It is preferable that the polyethylene glycol monoether compound have a boiling point of 200° C. or more, and more preferably 250° C. or more at normal pressure. It is preferable that the polyethylene glycol monoether compound have a flash point of 100° C. or more, and more preferably 130° C. or more. Such a polyethylene glycol monoether compound reduces the volatility of the non-aqueous ink composition. For example, vaporization of the ink composition in a tube that transports the ink composition from an ink cartridge to a printer head can be suppressed so that accumulation of a solid in the tube can be prevented or reduced.

Examples of the polyethylene glycol monoether compound include triethylene glycol monoether compounds (e.g., triethylene glycol monomethyl ether and triethylene glycol monobutyl ether), and a mixture of polyethylene glycol monoether compounds (particularly polyethylene glycol mono methyl ether) of which n in the general formula (4) is 4 to 6, such as a mixture of tetraethylene glycol monomethyl ether, pentaethylene glycol monomethyl ether, and hexaethylene glycol monomethyl ether.

The non-aqueous ink composition according to this embodiment includes an organic solvent other than those mentioned above.

As such an organic solvent, a polar organic solvent such as an alcohol (e.g., methyl alcohol, ethyl alcohol, propyl alcohol, butyl alcohol, or fluorinated alcohol), a ketone (e.g., acetone, methyl ethyl ketone, or cyclohexanone), a carboxylate (e.g., methyl acetate, ethyl acetate, propyl acetate, butyl acetate, methyl propionate, or ethyl propionate), or an ether (e.g., diethyl ether, dipropyl ether, tetrahydrofuran, or dioxane) may be preferably used.

When the non-aqueous ink composition according to this embodiment includes at least one of the diethylene glycol compound, the dipropylene glycol compound, and the lactone, but does not include the polyethylene glycol monoether compound, it is preferable that the total amount of the diethylene glycol compound, the dipropylene glycol compound, and the lactone be 75 mass % or more of the total amount of the organic solvent components.

When the non-aqueous ink composition according to this embodiment includes the diethylene glycol compound, the dipropylene glycol compound, the lactone, and the polyethylene glycol monoether compound, it is preferable that the total amount of the diethylene glycol compound, the dipropylene glycol compound, the lactone, and the polyethylene glycol monoether compound be 80 mass % or more of the total amount of the organic solvent components.

1.3 Cellulose Acetate Butyrate Resin

The non-aqueous ink composition according to this embodiment includes a cellulose acetate butyrate resin (hereinafter referred to as "CAB resin") having a butyl content of 16.5 to 48%.

Examples of the cellulose ester resin used as the viscosity controller include cellulose acetate (CA), cellulose acetate propionate (CAP), cellulose acetate butyrate (CAB), cellulose propionate (CP), cellulose triacetate (CAT), and the like. However, when using a cellulose ester resin other than the CAB resin, an image having clear glossiness cannot be formed (i.e., a mat image is obtained).

When the CAB resin has a butyl content of 16.5 to 48%, the object of the invention can be achieved. It is preferable that the CAB resin have a butyl content of 16.5 to 39%. If the butyl content of the CAB resin is less than 16.5%, the CAB resin may not be dissolved in the organic solvent. As a result, the CAB resin may not function as a viscosity controller. If the butyl content of the CAB resin is more than 48%, the solubility of the CAB resin in the organic solvent increases to a large extent so that the desired viscosity may not be obtained. As a result, the glossiness of the metal image may be insufficient.

The weight average molecular weight of the CAB resin is preferably 60,000 to 90,000, and more preferably 70,000 to 80,000. The desired viscosity may not be obtained when the weight average molecular weight of the CAB resin is outside the above range.

The CAB resin is preferably added to the ink composition in an amount of 0.01 to 10 mass %, and more preferably 0.1 to 5 mass %. The pigment can advantageously adheres to a recording medium by adding the CAB resin in an amount within this range.

1.4 Surfactant

The non-aqueous ink composition according to this embodiment may further include at least one surfactant selected from a polyether-modified silicone surfactant and a polyester-modified silicone surfactant. These surfactants are preferably added to the non-aqueous ink composition in an amount of 0.01 to 10 mass % based on the content of the metallic pigment in the ink composition. This improves the wettability of the ink composition to a recording medium so that the ink composition can be fixed quickly.

Specific examples of the polyester-modified silicone surfactant and the polyether-modified silicone surfactant include BYK-347, BYK-348, BYK-UV3500, BYK-UV3570, BYK-UV3510, and BYK-UV3530 (manufactured by Bic Chemie Japan Co., Ltd.).

1.5 Other Additives

The non-aqueous ink composition according to this embodiment may further include an antioxidant, a UV absorber, and the like.

Examples of the antioxidant include 2,3-butyl-4-oxyanisole (BHA), 2,6-di-t-butyl-p-cresol (BHT), and the like. The antioxidant is preferably added to the ink composition in an amount of 0.01 to 0.5 mass %.

Examples of the UV absorber include a benzophenone compound, a benzotriazole compound, and the like. The UV absorber is preferably added to the ink composition in an amount of 0.01 to 0.5 mass %.

1.6 Properties of Non-Aqueous Ink Composition

The non-aqueous ink composition according to this embodiment preferably has a viscosity at 20° C. of 2 to 10 mPa·s, and more preferably 3 to 5 mPa·s. If the non-aqueous ink composition has a viscosity at 20° C. within this range, an appropriate quantity of ink is discharged from a nozzle so that displacement or scattering of the ink can be prevented.

The non-aqueous ink composition according to this embodiment preferably has a surface tension of 20 to 50 mN/m. If the surface tension of the non-aqueous ink composition is less than 20 mN/m, an ink may be spread over the surface of a head, or may bleed out from the head. As a result, the ink may not be appropriately discharged from the nozzle. If the surface tension of the non-aqueous ink composition is more than 50 mN/m, the ink composition may not be spread over a recording medium, whereby printing may be impaired.

1.7 Method of Producing Non-Aqueous Ink Composition

The non-aqueous ink composition may be produced using a known method. For example, the metallic pigment, a dispersant, and part of the organic solvent are mixed, and are mixed using a ball mill, a bead mill, ultrasonic waves, a jet mill, or the like to prepare a pigment dispersion. The balance of the organic solvent, a binder resin, and other additives (e.g., viscosity controller or surfactant) are then added to the pigment dispersion with stirring to obtain a metallic pigment composition.

2. INKJET RECORDING METHOD

An inkjet recording method according to one embodiment of the invention includes discharging droplets of the above-described inkjet-recording non-aqueous ink composition to a recording medium to print a metallic glossy image. The drying temperature during printing is preferably 8 to 40° C. According to the above inkjet recording method, the glossiness of the inkjet-recording non-aqueous ink composition can be sufficiently utilized while maintaining excellent metallic glossiness.

The term "during printing" used herein refers to a period from the time immediately after discharging droplets of the ink to the recording medium using an inkjet recording device to the time when the ink has been dried.

The inkjet recording device which can be used in this embodiment is not particularly limited insofar as the inkjet recording device can discharge droplets of the ink to the recording medium for recording. It is preferable that the inkjet recording device have a function of heating the recording medium during printing. Examples of the heating function include a printing heater function that causes a heat source to directly come in contact with the recording medium, a drier function that applies infrared radiation or microwaves (electromagnetic waves having a maximum wave length of about 2450 MHz) to the recording medium or sends a warm current of air to the recording medium, and the like. The printing heater function and the drier function may be used either individually or in combination. This enables an adjustment of the drying temperature during printing.

Note that the recording medium provided with droplets of the ink discharged using the inkjet recording device may be dried in a drier or a thermostat bath set at a given temperature.

The drying temperature during printing must be 8 to 40° C., preferably 8 to 35° C., and more preferably 8 to 29° C. If the drying temperature during printing is within the above range, a recorded matter can satisfy a metallic glossiness criteria described below. Moreover, the original glossiness of the non-aqueous ink composition can be achieved as compared with the case where the drying temperature during printing exceeds 40° C.

Examples of the metallic glossiness criteria are given below.

Specifically, a recorded matter is determined to have metallic glossiness when the 20° specular glossiness defined in JIS Z 8741 measured on the recording medium is 250 or more from the viewpoint of angular dependence. On the other hand, when the 20° specular glossiness is less than 250, such an image does show specular glossiness by visual observation, and is observed as a gray image.

The recording medium is not particularly limited. For example, various recording media such as regular paper, inkjet paper (mat paper), glass, a plastic film (e.g., vinyl chloride or polyvinyl butyral), a film in which a substrate is coated with a plastic or a receiving layer, a metal, and a printed circuit board may be used. The recording medium used in this embodiment is preferably a film since the non-aqueous ink composition is used. Specific examples of the material for the film include polyvinyl chloride, polyethylene terephthalate, polyethylene, polyvinylidene chloride, polyvinyl alcohol, polyester, polycarbonate, polyacrylonitrile, cellophane, nylon, an ethylene-vinyl acetate copolymer, an ethylene-vinyl alcohol copolymer, an ethylene-methacrylic acid copolymer, and the like.

An ink-receiving layer that contains a resin may be formed on the printing-side outermost surface of the film. The resin is not particularly limited. Examples of the resin include cellulose derivatives such as cellulose acetate butyrate (CAB) and cellulose propionate (CP), a polyester resin, a polyurethane resin, a polyacrylic resin, and the like. It is preferable that the ink-receiving layer contain the same resin as the resin added to the non-aqueous ink composition. This improves ink fixation. In this embodiment, it is most preferable to use a film in which an ink-receiving layer that contains cellulose acetate butyrate is formed on the printing-side outermost surface as the recording medium.

Examples of a recording method employed for the inkjet recording device include a method that applies a strong electric field between a nozzle and an accelerating electrode placed forward of the nozzle to successively discharge droplets of an ink from the nozzle, and supplies a printing information signal to deflection electrodes while the ink droplets travels between the deflection electrodes to record an image, or a method that discharges ink droplets corresponding to the printing information signal without deflecting the ink droplets (electrostatic attraction method); a method that discharges ink droplets by applying a pressure to a liquid ink using a small pump and mechanically vibrating a nozzle using a crystal vibrator or the like; a method that applies a pressure and a printing information signal to a liquid ink using a piezoelectric element to discharge and record the ink droplets (piezo method); a method that causes a liquid ink to be foamed with heating using a micro-electrode according to a printing information signal to discharge and record the ink droplets (thermal jet method); and the like.

The non-aqueous ink composition is preferably discharged onto the recording medium in an amount of 0.1 to 100 mg/cm$^2$, and more preferably 1.0 to 50 mg/cm$^2$ from the viewpoint of specular glossiness, printing process, and cost.

The dry weight of the metallic pigment that forms an image on the recording medium is preferably 0.0001 to 3.0 mg/cm$^2$ from the viewpoint of specular glossiness, printing process, and cost.

A recorded matter according to this embodiment includes an image recorded by the above inkjet recording method. Since the recorded matter is obtained by the above inkjet recording method using the non-aqueous ink composition described later, the recorded matter has a 20° specular glossiness of 250 or more and exhibits the original glossiness of the non-aqueous ink composition.

3. EXAMPLES

3.1 Preparation of Metallic Pigment Liquid Dispersion

A resin layer coating liquid containing 3.0 mass % of a cellulose ester resin and 97 mass % of diethylene glycol diethyl ether (manufactured by Nippon Nyukazai Co., Ltd.) was uniformly applied to a PET film having a thickness of 100 micrometers by bar coating, and was dried at 60° C. for 10 minutes to form a resin layer thin film on the PET film. As the cellulose ester resin, a CAB resin (butyl content: 16.5 to 19%), a CAB resin (butyl content: 35 to 39%), a CAB resin (butyl content: 44 to 48%), a CAB resin (butyl content: 50 to 54%) (manufactured by ACROS ORGANICS), or a polyvinyl butyral resin ("S-LEC BL-10" manufactured by Sekisui Chemical Co., Ltd.) was used.

An aluminum deposited layer having an average thickness of 20 nm was formed on the resin layer using a vacuum deposition device ("VE-1010" manufactured by Vacuum Device Inc.).

The laminate formed by the above method was immersed in diethylene glycol diethyl ether, and was subjected to separation, refinement, and dispersion using an ultrasonic disperser ("VS-150" manufactured by AS ONE Corporation) to obtain a metallic pigment liquid dispersion (total ultrasonic dispersion treatment time: 12 hours).

The resulting metallic pigment liquid dispersion was filtered through an SS mesh filter with a pore size of 5 micrometers to remove large particles. After placing the filtrate in a round bottom flask, diethylene glycol diethyl ether was evaporated using a rotary evaporator. The metallic pigment liquid dispersion was thus concentrated. The concentration of the metallic pigment liquid dispersion was then adjusted to obtain a 5 mass % metallic pigment liquid dispersion.

The particle size distribution and the 50% volume average particle diameter of the metallic pigment were measured using a laser particle size distribution measurement device ("LMS-30" manufactured by Seishin Enterprise Co., Ltd.). The 50% average particle diameter was 1.03 micrometers, and the maximum particle diameter was 4.9 micrometers.

The thicknesses of 10 metallic pigment particles selected at random were measured using an electron microscope. The average thickness was 20 nm.

3.2 Preparation of Metallic Pigment Ink Composition

A metallic pigment ink composition was prepared according to the composition shown in Tables 1 to 5 using the metallic pigment liquid dispersion prepared by the above method. Additives were mixed and dissolved in a solvent to prepare an ink solvent. The metallic pigment liquid dispersion prepared by the above method was added into the ink solvent. The components were mixed and stirred using a magnetic stirrer for 30 minutes at normal temperature and normal pressure. The ink composition thus obtained was filtered through a stainless steel mesh filter (pore size: 10 micrometers) to obtain a metallic pigment ink composition. The metallic pigment ink compositions used in Examples 1 to 21 and Comparative Examples 1 to 14 were thus prepared.

Diethylene glycol diethyl ether, tetraethylene glycol dimethyl ether, and tetraethylene glycol monobutyl ether shown in Tables 1 to 5 are products manufactured by Nippon Nyukazai Co., Ltd. Gamma-butyrolactone manufactured by Kanto Chemical Co., Inc. was used. The unit for each component is mass %.

3.3 Evaluation Test (a) Evaluation of Glossiness

An inkjet printer ("SP-300V" manufactured by Roland DG Corporation) was used. A black cartridge was charged with the metallic pigment ink composition obtained in "3.2 Preparation of metallic pigment ink composition". A solid image was printed while setting the printing heater temperature and the drier temperature (hereinafter referred to as "drying temperature") at temperatures shown in Tables 1 to 5. This inkjet printer discharges droplets of the metallic pigment ink composition to a recording medium, causes the recording medium to pass through a printing heater section, and dries the recorded image by sending a warm current of air to the recording medium from a drier section. As the recording medium, a solvent ink printing medium (A4-cut) ("SPVC-G-1270T" manufactured by Roland DG Corporation) was used.

The 20° glossiness of the resulting image was measured using a glossmeter ("MULTI Gloss 268" manufactured by Konica Minolta). The glossiness of the image was evaluated according to the following criteria. The results are shown in Tables 1 to 5.
A: glossiness was 300 or more (clear metallic glossiness)
B: glossiness was 250 or more and less than 300 (mat metallic glossiness)
C: glossiness was less than 250 (no metallic glossiness)

(b) Evaluation of Drying Capability

A solid image was printed at room temperature in the same manner as in "(a) Evaluation of glossiness". The period of time until the ink was dried at room temperature was measured. The drying capability was evaluated according to the following criteria. The results are shown in Tables 1 to 5.
A: 5 minutes or less
B: 5 to 10 minutes
C: 10 minutes or more (c) Evaluation of Ink Discharge Stability A solid image was successively printed at room temperature in the same manner as in "(a) Evaluation of glossiness". The presence or absence of dead pixels, incorrect discharge, and ink scattering was visually observed. The ink discharge stability was evaluated according to the following criteria. The results are shown in Tables 1 to 5.
A: Dead pixels, incorrect discharge, and ink scattering occurred less than 10 times during successive printing for 48 hours.
B: Dead pixels, incorrect discharge, and ink scattering occurred 10 times or more and less than 20 times during successive printing for 48 hours.
C: Dead pixels, incorrect discharge, and ink scattering occurred 20 times or more during successive printing for 48 hours.

TABLE 1

|  | Example 1 | Example 2 | Example 3 | Example 4 | Example 5 | Example 6 | Example 7 |
|---|---|---|---|---|---|---|---|
| Metallic pigment (solid content) | 1.0 | 1.0 | 1.0 | 1.0 | 1.0 | 1.0 | 1.0 |
| Diethylene glycol diethyl ether | 65.65 | 65.65 | 65.65 | 65.65 | 65.65 | 65.65 | 65.65 |
| gamma-Butyrolactone | 15.0 | 15.0 | 15.0 | 15.0 | 15.0 | 15.0 | 15.0 |
| Tetraethylene glycol dimethyl ether | 15.0 | 15.0 | 15.0 | 15.0 | 15.0 | 15.0 | 15.0 |
| Tetraethylene glycol monobutyl ether | 3.0 | 3.0 | 3.0 | 3.0 | 3.0 | 3.0 | 3.0 |
| CAB resin (butyl content: 16.5 to 19%) | 0.35 | 0.35 | 0.35 | 0.35 | 0.35 | 0.35 | 0.35 |
| Drying temperature (° C.) | 5 | 8 | 25 | 35 | 40 | 43 | 45 |
| Ink discharge stability | A | A | A | A | A | A | A |
| Drying capability | B | A | A | A | A | A | A |
| Glossiness | A | A | A | A | A | B | C |

TABLE 2

|  | Example 8 | Example 9 | Example 10 | Example 11 | Example 12 | Example 13 | Example 14 |
|---|---|---|---|---|---|---|---|
| Metallic pigment (solid content) | 1.5 | 1.5 | 1.5 | 1.5 | 1.5 | 1.5 | 1.5 |
| Diethylene glycol diethyl ether | 65.15 | 65.15 | 65.15 | 65.15 | 65.15 | 65.15 | 65.15 |
| gamma-Butyrolactone | 15.0 | 15.0 | 15.0 | 15.0 | 15.0 | 15.0 | 15.0 |
| Tetraethylene glycol dimethyl ether | 15.0 | 15.0 | 15.0 | 15.0 | 15.0 | 15.0 | 15.0 |
| Tetraethylene glycol monobutyl ether | 3.0 | 3.0 | 3.0 | 3.0 | 3.0 | 3.0 | 3.0 |
| CAB resin (butyl content: 35 to 39%) | 0.35 | 0.35 | 0.35 | 0.35 | 0.35 | 0.35 | 0.35 |
| Drying temperature (° C.) | 5 | 8 | 25 | 35 | 40 | 43 | 45 |
| Ink discharge stability | A | A | A | A | A | A | A |
| Drying capability | B | A | A | A | A | A | A |
| Glossiness | A | A | A | A | A | B | C |

TABLE 3

|  | Example 15 | Example 16 | Example 17 | Example 18 | Example 19 | Example 20 | Example 21 |
|---|---|---|---|---|---|---|---|
| Metallic pigment (solid content) | 2.0 | 2.0 | 2.0 | 2.0 | 2.0 | 2.0 | 2.0 |
| Diethylene glycol diethyl ether | 62.5 | 62.5 | 62.5 | 62.5 | 62.5 | 62.5 | 62.5 |
| gamma-Butyrolactone | 15.0 | 15.0 | 15.0 | 15.0 | 15.0 | 15.0 | 15.0 |
| Tetraethylene glycol dimethyl ether | 15.0 | 15.0 | 15.0 | 15.0 | 15.0 | 15.0 | 15.0 |
| Tetraethylene glycol monobutyl ether | 3.0 | 3.0 | 3.0 | 3.0 | 3.0 | 3.0 | 3.0 |
| CAB resin (butyl content: 44 to 48%) | 2.5 | 2.5 | 2.5 | 2.5 | 2.5 | 2.5 | 2.5 |
| Drying temperature (° C.) | 5 | 8 | 25 | 35 | 40 | 43 | 45 |
| Ink discharge stability | B | B | B | B | B | B | B |
| Drying capability | B | A | A | A | A | A | A |
| Glossiness | A | A | A | B | B | C | C |

TABLE 4

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Metallic pigment (solid content) | 1.5 | 1.5 | 1.5 | 1.5 | 1.5 | 1.5 | 1.5 |
| Diethylene glycol diethyl ether | 62.5 | 62.5 | 62.5 | 62.5 | 62.5 | 62.5 | 62.5 |
| gamma-Butyrolactone | 15.0 | 15.0 | 15.0 | 15.0 | 15.0 | 15.0 | 15.0 |
| Tetraethylene glycol dimethyl ether | 15.0 | 15.0 | 15.0 | 15.0 | 15.0 | 15.0 | 15.0 |
| Tetraethylene glycol monobutyl ether | 3.0 | 3.0 | 3.0 | 3.0 | 3.0 | 3.0 | 3.0 |
| Polyvinyl butyral resin | 3.0 | 3.0 | 3.0 | 3.0 | 3.0 | 3.0 | 3.0 |
| Drying temperature (° C.) | 5 | 8 | 20 | 35 | 40 | 43 | 45 |
| Ink discharge stability | C | C | C | C | C | C | C |
| Drying capability | C | C | C | C | C | C | C |
| Glossiness | C | C | C | C | C | C | C |

TABLE 5

|  | Comparative Example 8 | Comparative Example 9 | Comparative Example 10 | Comparative Example 11 | Comparative Example 12 | Comparative Example 13 | Comparative Example 14 |
|---|---|---|---|---|---|---|---|
| Metallic pigment (solid content) | 1.5 | 1.5 | 1.5 | 1.5 | 1.5 | 1.5 | 1.5 |
| Diethylene glycol diethyl ether | 61.0 | 61.0 | 61.0 | 61.0 | 61.0 | 61.0 | 61.0 |
| gamma-Butyrolactone | 15.0 | 15.0 | 15.0 | 15.0 | 15.0 | 15.0 | 15.0 |
| Tetraethylene glycol dimethyl ether | 15.0 | 15.0 | 15.0 | 15.0 | 15.0 | 15.0 | 15.0 |
| Tetraethylene glycol monobutyl ether | 3.0 | 3.0 | 3.0 | 3.0 | 3.0 | 3.0 | 3.0 |
| CAB resin (butyl content: 50 to 54%) | 4.5 | 4.5 | 4.5 | 4.5 | 4.5 | 4.5 | 4.5 |
| Drying temperature (° C.) | 5 | 8 | 25 | 35 | 40 | 43 | 45 |
| Ink discharge stability | C | C | C | C | C | C | C |
| Drying capability | C | B | A | A | A | A | A |
| Glossiness | C | C | C | C | C | C | C |

3.4 Evaluation Results (a) Glossiness

As is clear from the results shown in Tables 1 to 3, when using the metallic pigment ink composition containing the CAB resin having a butyl content of 16.5 to 48% as the cellulose resin, the images obtained in Examples 6, 7, 13, 14, 20, and 21 in which the drying temperature was 43° C. or 45° C. had a 20° specular glossiness significantly lower than those of the images obtained while setting the drying temperature at 40° C. or less. Therefore, it was confirmed that the metallic glossiness of the metallic pigment ink composition can be sufficiently obtained by setting the drying temperature at 40° C. or less.

As is clear from the results shown in Tables 4 and 5, when using the metallic pigment ink compositions of Comparative Examples 1 to 5 and 8 to 12 in which the polyvinyl butyral resin or the CAB resin having a butyl content of 50 to 54% was used as the cellulose resin, the resulting images had a 20° specular glossiness of less than 250 (metallic glossiness was not obtained) even when the drying temperature was 40° C. or less.

(b) Drying Capability

As is clear from the results shown in Tables 1 to 5, the metallic pigment ink composition containing the CAB resin as the cellulose resin exhibited an excellent ink drying capability as compared with the metallic pigment ink composition using the polyvinyl butyral resin. Even when using the metallic pigment ink composition containing the CAB resin as the cellulose resin, a period of time from 5 minutes or more to less than 10 minutes was required for the ink to be dried when the drying temperature was 5° C.

Therefore, it was confirmed that the ink drying capability was improved by using the metallic pigment ink containing the CAB resin as the cellulose and setting the drying temperature at 8° C. or more.

(c) Ink Discharge Stability

As is clear from the results shown in Table 1 and 2, when using the metallic pigment ink composition containing the CAB resin having a butyl content of 16.5 to 39% as the cellulose resin, dead pixels, incorrect discharge, and ink scattering occurred less than 10 times (i.e., the ink was discharged stably) during successive printing for 48 hours.

As is clear from the results shown in Table 3, when using the metallic pigment ink composition containing the CAB resin having a butyl content of 44 to 48% as the cellulose resin, dead pixels, incorrect discharge, and ink scattering occurred 10 times or more and less than 20 times (i.e., ink discharge was unstable to some extent) during successive printing for 48 hours.

As is clear from the results shown in Tables 4 and 5, when using the metallic pigment ink composition containing the CAB resin having a butyl content of 50 to 54% as the cellulose resin, dead pixels, incorrect discharge, and ink scattering occurred 20 times or more (i.e., ink discharge was unstable) during successive printing for 48 hours.

Specifically, the discharge stability of the metallic pigment ink composition was improved by using the metallic pigment ink composition containing the CAB resin having a butyl content of 16.5 to 39% as the cellulose resin.

The invention is not limited to the above-described embodiments, and various modifications can be made. For example, the invention includes various other configurations substantially the same as the configurations described in the embodiments (in function, method and result, or in objective and result, for example). The invention also includes a configuration in which an unsubstantial portion in the described embodiments is replaced. The invention also includes a configuration having the same effects as the configurations described in the embodiments, or a configuration able to achieve the same objective. Further, the invention includes a configuration in which a publicly known technique is added to the configurations in the embodiments.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. An inkjet-recording non-aqueous ink composition comprising: a metallic pigment; an organic solvent; and a cellulose acetate butyrate resin having a butyl content of 16.5 to 48%.

2. The inkjet-recording non-aqueous ink composition as defined in claim 1, the metallic pigment being tabular particles; and when a major axis, a minor axis, and a thickness of each of the tabular particles in a plane are respectively referred to as X, Y, and Z, the tabular particles having a circle-equivalent 50% average particle diameter R50 determined based on an X-Y plane area of 0.5 to 3 micrometers, and R50/Z>5 being satisfied.

3. The inkjet-recording non-aqueous ink composition as defined in claim 1, the metallic pigment being aluminum or an aluminum alloy.

4. The inkjet-recording non-aqueous ink composition as defined in claim 1, the concentration of the metallic pigment ranging from 0.5 to 3.0 mass %.

5. The inkjet-recording non-aqueous ink composition as defined in claim 1, the cellulose acetate butyrate resin having a weight average molecular weight of 60,000 to 90,000.

6. The inkjet-recording non-aqueous ink composition as defined in claim 1, the butyl content of the cellulose acetate butyrate resin being 16.5 to 38%.

7. The inkjet-recording non-aqueous ink composition as defined in claim 1, the organic solvent containing at least one compound selected from an alkylene glycol compound and a lactone.

8. The inkjet-recording non-aqueous ink composition as defined in claim 7, the alkylene glycol compound being at least one compound selected from an ethylene glycol compound and a propylene glycol compound.

9. The inkjet-recording non-aqueous ink composition as defined in claim 7, the lactone being at least one compound selected from beta-propiolactone, beta-butyrolactone, gamma-butyrolactone, gamma-valerolactone, delta-valerolactone, and epsilon-caprolactone.

10. An inkjet recording method comprising: discharging droplets of the inkjet-recording non-aqueous ink composition as defined in claim 1 to a recording medium to print a metallic glossy image.

11. The inkjet recording method as defined in claim 10, the recording medium being a film of a material selected from polyvinyl chloride, polyethylene terephthalate, polyethylene, polyvinylidene chloride, polyvinyl alcohol, polyester, polycarbonate, polyacrylonitrile, cellophane, nylon, an ethylene-vinyl acetate copolymer, an ethylene-vinyl alcohol copolymer, and an ethylene-methacrylic acid copolymer.

12. The inkjet recording method as defined in claim 10, an ink-receiving layer that contains a resin being formed on a printing-side outermost surface of the recording medium.

13. The inkjet recording method as defined in claim 10, a drying temperature during printing being 8 to 40° C.

14. A recorded matter comprising a metallic glossy image recorded by the inkjet recording method as defined in claim 10.

15. An inkjet-recording non-aqueous ink composition comprising: a metallic pigment; an organic solvent; and a cellulose acetate butyrate resin having a butyl content of 16.5 to 19%.

* * * * *